United States Patent Office 2,804,191
Patented Aug. 27, 1957

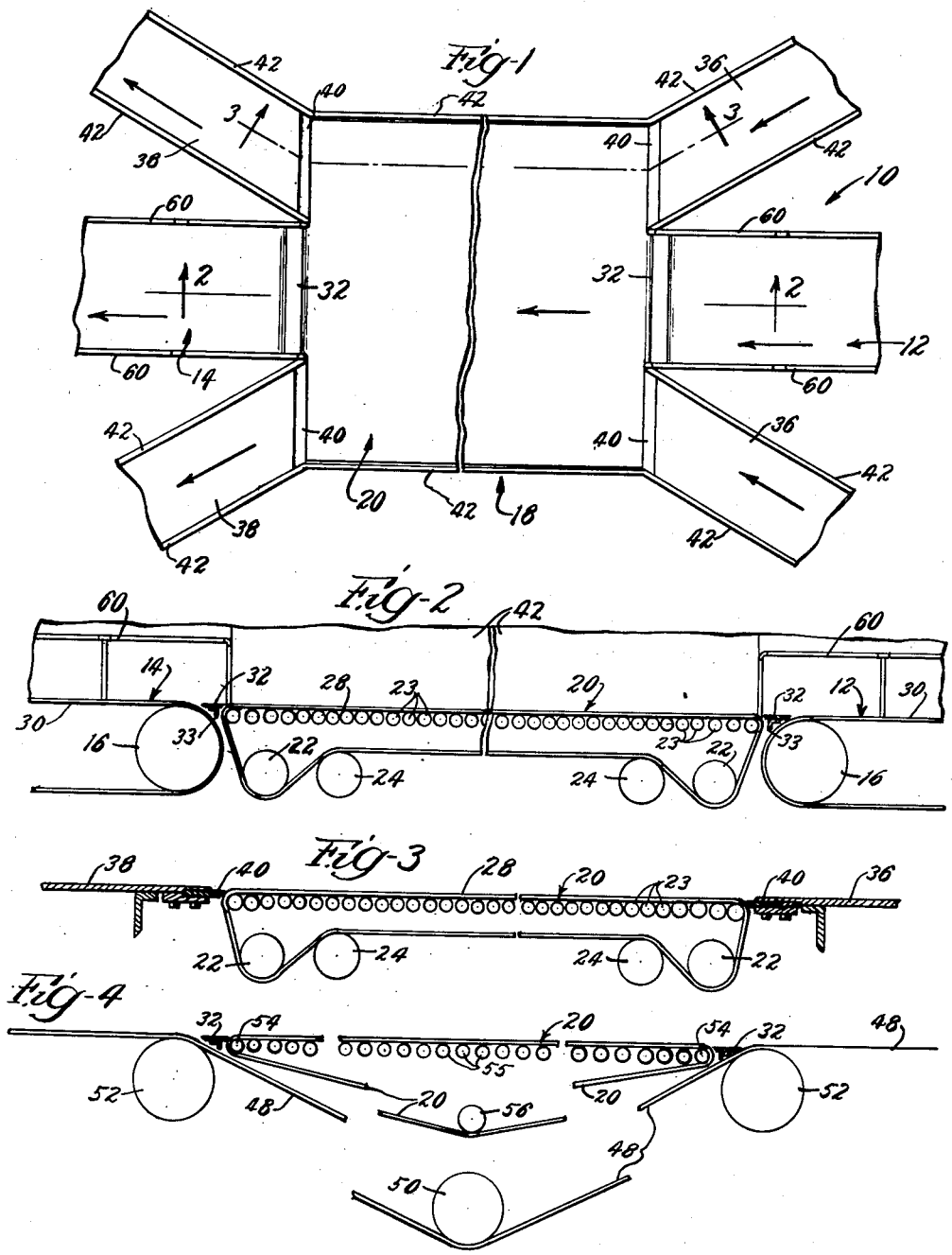

2,804,191

INTERMEDIATE STATION FOR HIGH SPEED MOVING SIDEWALK

William F. King, Aurora, Ill., assignor to Stephens-Adamson Mfg. Co., a corporation of Illinois Application September 23, 1955, Serial No. 536,259

1 Claim. (Cl. 198—76)

My invention relates to an intermediate station for a high speed moving sidewalk, and more particularly, to a low speed passenger conveyor and means for boarding same adapted to be interposed in the line of travel of a high speed moving sidewalk and serving as an intermediate station therefor.

Experience has shown that the success of high speed moving sidewalk passenger transportation systems depends largely on the manner in which the passengers are loaded and unloaded, and how fast the moving sidewalk may operate with maximum safety to passengers leaving and boarding same. Moving sidewalk apparatus must be so arranged that prospective passengers may board and leave the apparatus with ease and confidence, and yet the conveyor must operate at sufficiently high speeds to handle rush hour traffic.

Tests have demonstrated that passengers may safely step to a moving sidewalk from a stationary loading platform or ramp, or vice versa, or step from a slowly moving conveyor to a high speed conveyor, or vice versa, when the passenger transfers from one to the other in the direction of travel of the conveyor or conveyors and the differential in speed of the elements comprising the apparatus does not exceed one and one half miles per hour.

Intermediate stations for moving sidewalks in the past have generally comprised a stationary platform positioned adjacent the conveyor element forming the moving sidewalk, or an auxiliary low speed conveyor running alongside and close to said conveyor element. However, none, so far as I am aware, have included a conveyor element interposed in the line of travel of the high speed moving sidewalk.

The principal object of the present invention is to provide an intermediate loading and unloading station for a high speed moving sidewalk which includes a conveyor element interposed in the line or direction of travel of the high speed moving sidewalk.

Another object of the present invention is to provide an intermediate loading and unloading station for a high speed moving sidewalk providing the aforementioned safe increment of speed differential, and which allows the passenger to step therefrom and thereto by stepping in the direction in which he and the conveyors are moving.

Still another object of the present invention is to provide an intermediate loading and unloading station for a high speed moving sidewalk which allows the passengers to load and unload to and from both sides of the moving sidewalk.

In accordance with the illustrated embodiments of the invention, I provide an intermediate station including a low speed, relatively wide, endless belt conveyor interposed in the line of travel of the high speed moving sidewalk. Preferably the low speed conveyor is sufficiently wide to project outwardly of both sides of the moving sidewalk, and stationary passenger platforms are positioned adjacent the ends of the outwardly extending sides thereof. In one embodiment of the invention, the low speed conveyor is interposed between adjacent ends of two high speed endless belts forming the high speed elements of the moving sidewalk, while in another form of the invention, the low speed conveyor is positioned over a deflected portion of a main high speed element comprising the moving sidewalk. Preferably, resilient foot guards are interposed between the ends of the low speed conveyor and the adjacent portions of the high speed elements leading thereto and therefrom, and between the low speed conveyor and said stationary platforms. I also prefer to provide paneling or railing defining the passageways leading to and from the low speed conveyor for the purpose of guiding the passengers in the most desirable direction of movement with respect to the low speed conveyor.

Other objects, uses and advantages will be obvious or become apparent from a consideration of the following description and the drawing.

In the drawing:

Figure 1 is a plan view of a portion of a high speed moving sidewalk, illustrating a preferred form of intermediate loading and unloading station therefor arranged in accordance with the principles of my invention;

Figure 2 is a sectional view along line 2—2 of Figure 1;

Figure 3 is a sectional view along line 3—3 of Figure 1; and,

Figure 4 is a sectional view similar to Figure 2, illustrating a modified form of the invention.

Reference numeral 10 of Figure 1 generally indicates a high speed moving sidewalk comprising two main, relatively long, high speed conveyors 12 and 14 serving as relatively fast, long-range transport elements for the moving sidewalk apparatus. Conveyors 12 and 14 are shown in Figure 2 as comprising belt conveyors trained over pulleys or idlers 16 and driven through and otherwise supported by any conventional mechanism or structures.

The intermediate station comprising one form of the present invention is generally indicated at 18, and in the embodiment of Figures 2–3, it comprises a relatively wide low speed endless belt conveyor 20 interposed between the adjacent ends of conveyors 12 and 14, and in the line of travel of said conveyors. The belt conveyor 20 diagrammatically illustrated is shown as trained over pulleys 22, and idlers 23. Conveyor 20 may be provided with conventional tensioning means, such as one or more pulleys 24. A suitable slider plate may be substituted for the intermediate idlers 23, if so desired.

The conveyor 20 is shown as presenting an upper tread or supporting surface 28 substantially level with the upper tread or supporting surfaces 30 of conveyors 12 and 14. Preferably the gap between the tread surfaces of conveyor 20 and conveyors 12 and 14, which ordinarily is so small that a passenger's foot can span it, is closed by a resilient guard 32 including a strip of rubber-like material in substantial wiping contact with the tread surfaces of the respective conveyors. The foot guards 32 yield enough under foot or heel pressure to hug the surfaces of the respective belts as the passenger passes thereover, thereby establishing a closed seal with the respective belts and prevent a passenger's clothing, shoestrings or the like, from being drawn between the respective guards and belts. Preferably, the strips of rubber-like material comprising the guards 32 are of such a shape, durometer, and friction coefficient, that, if a passenger merely stands on, for instance, the right hand belt 12, as he approaches the belt 20, the belt 12 will force the shoe to ride over the guard and the tendency of shoestrings and the like to be drawn around pulley 16 will be eliminated. The rubber-like material may be secured to supporting angle bar 33, or any other suitable structure.

In the illustrated embodiment, the width of belt 20 is approximately three times the width of the high speed belts 12 and 14, and the former is centered so that both sides thereof extend outwardly of the sides of the conveyors 12 and 14 approximately equal distances. A stationary passenger platform is positioned adjacent each end of the outwardly extending sides of belt 20, reference numeral 36 designating loading platforms, and reference numeral 38 designating unloading platforms. Preferably a resilient edge piece or foot guard 40 is interposed between the respective platforms and the belt somewhat as indicated in Figure 3, or a suitable comb, such as those commonly found in escalators, may be employed. Paneling or guide walls 42 may be fixed along the platforms 36 and 38 to define passageways for guiding the passengers in the proper manner to and from the conveyors, as hereinafter described.

The belt 20 is driven at a speed of one and one half miles per hour, thereby permitting the high speed conveyors to be driven at three miles per hour. A passenger being conveyed by the high speed conveyor 12 may easily step from this conveyor to belt 20, since the difference in speed is maintained at the aforementioned safe increment, and the passenger is stepping in the direction in which both belts are moving. If the passenger desires to continue on the high speed moving sidewalk, he stays in the middle portion of belt 20 and steps to the high speed conveyor 14 in the same manner that he steps from conveyor 12 to belt 20. If the passenger desires to get off at the intermediate station 18, after stepping onto the belt 20 he walks toward the exit on the side which he desires to unload from, and steps from belt 20 to a platform 38. In moving toward the desired unloading platform 38, he is guided by the angled position of the passageway defined by the paneling 42. The passageways defined by paneling 42 merely provide a mental guide for the passenger moving toward them, and in practice the passenger steps from the belt 20 to a platform 38 by stepping in the direction in which he is moving. The passageways over platforms 38 may be enlarged slightly at their entrances, if so desired, to provide more room, if this is considered necessary.

A passenger desiring to board the moving sidewalk apparatus enters through the passageway defined by the paneling 42 on the loading platform 36 nearest him, and as the passageway is angled toward the middle portion of the belt 20, which delivers passengers directly to the conveyor 14, the passenger is directed toward the proper standing area of the belt 20. If the passenger changes his mind at the last minute, by merely staying on the side of the conveyor 20 by which he entered the system, the passenger is conveyed to the opposite unloading station 38.

Figure 4 illustrates a modification of the invention wherein, a high speed conveyor belt 48, similar to conveyors 12 and 14, is deflected by one or more pulleys 50 interposed between spaced pulleys 52, and the low speed belt 20 is interposed over the deflected portion of belt 48. The belt 20 of this embodiment is trained over small pulleys 54 and intervening idlers 55, and may be driven through one of the pulleys or otherwise. Resilient foot guards 32 may be interposed in the gap between the belt 20 and the adjacent portions of high speed belt 48 in a manner similar to that illustrated in Figure 2 and a suitable tensioning pulley 56 may be employed. The embodiment of Figure 4 is otherwise the same as that of Figures 1-3.

Hand rails 60 may be provided for convenience and safety of the passengers.

I contemplate that the paneling 42 may be omitted, if desired, since passengers may load to and unload from the belt 20 so easily that guiding means in most instances is unnecessary.

I also contemplate that supplemental belts may be interposed between the ends of belt 20 and the adjacent treads of the high speed belts where it is desired to run the high speed belts at speeds greater than three miles per hour. These supplemental belts would run at stepped speeds intermediate the speeds of the belt 20 and the high speed conveyors. Moreover, the element 20 may comprise a plurality of belts running side by side, for instance, three in number, rather than taking the form of the single belt illustrated. And, the element 20 may be positioned to extend outwardly at only one side of the high speed conveyor, if so desired.

The foregoing description and the drawing are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

An intermediate station for a high speed moving sidewalk comprising a low speed conveyor belt interposed in the line of travel of the moving sidewalk, said belt being of a greater width than said moving sidewalk and extending outwardly of either side of the moving sidewalk a sufficient distance to receive and deliver passengers on either side thereof, a stationary passenger platform at each end of each side of said belt, said platforms being respectively coextensive with the portions of said ends of said belt that extend outwardly of said moving sidewalk, each of said platforms at the unloading ends of said sides of said belt including means defining a passageway, said passageways diverging from the moving sidewalk in the direction of travel thereof, said passageways comprising means for guiding a passenger departing from said station in stepping from the rearward end of said belt toward the respective platforms by permitting the passenger to align himself with the passageway on the side of the moving sidewalk on which he wishes to depart.

References Cited in the file of this patent
UNITED STATES PATENTS

| | | |
|---|---|---|
| 558,180 | Hutchinson | Apr. 14, 1896 |
| 639,154 | Dodge | Dec. 12, 1899 |
| 1,412,969 | Sachs | Apr. 18, 1922 |
| 1,871,996 | Jennings | Aug. 16, 1932 |
| 2,536,961 | Smith | Jan. 2, 1951 |
| 2,599,221 | Bergmann | June 3, 1952 |
| 2,641,351 | Riley | June 9, 1953 |

FOREIGN PATENTS

| | | |
|---|---|---|
| 828,151 | France | Feb. 7, 1938 |
| 733,952 | Canada | July 20, 1955 |